(12) United States Patent
Antzutkin et al.

(10) Patent No.: US 11,565,248 B2
(45) Date of Patent: Jan. 31, 2023

(54) PROCESS FOR A MILD AQUEOUS SYNTHESIS OF TITANIUM PHOSPHATES—ION—EXCHANGERS HAVING SOLELY—H2PO4 ACTIVE GROUPS

(71) Applicants: Oleg N. Antzutkin, Luleå (SE); Mylène Claire Trublet, Solna (SE); Daniela Pencheva Rusanova-Naydenova, Luleå (SE)

(72) Inventors: Oleg N. Antzutkin, Luleå (SE); Mylène Claire Trublet, Solna (SE); Daniela Pencheva Rusanova-Naydenova, Luleå (SE)

( * ) Notice: Subject to any disclaimer, the term of this patent is extended or adjusted under 35 U.S.C. 154(b) by 464 days.

(21) Appl. No.: 16/760,338

(22) PCT Filed: Oct. 30, 2018

(86) PCT No.: PCT/SE2018/051115
§ 371 (c)(1),
(2) Date: Apr. 29, 2020

(87) PCT Pub. No.: WO2019/008907
PCT Pub. Date: May 9, 2019

(65) Prior Publication Data
US 2021/0197186 A1 Jul. 1, 2021

(30) Foreign Application Priority Data
Oct. 31, 2017 (SE) .................... 1751347-4

(51) Int. Cl.
*B01J 39/12* (2006.01)
*B01J 39/02* (2006.01)
(Continued)

(52) U.S. Cl.
CPC ............... *B01J 39/12* (2013.01); *B01J 39/02* (2013.01); *C01B 25/372* (2013.01);
(Continued)

(58) Field of Classification Search
None
See application file for complete search history.

(56) References Cited

U.S. PATENT DOCUMENTS 3,418,075 A 12/1968 Jean

OTHER PUBLICATIONS

Trublet et al, "Mild syntheses and surface characterization of amorphous TiO(OH)(H2PO4) H2O ion-exchanger," Materials Chemistry and Physics, 183, pp. 467-475 (Year: 2016).*
(Continued)

*Primary Examiner* — Colin W. Slifka
(74) *Attorney, Agent, or Firm* — Harness, Dickey & Pierce, P.L.C.

(57) ABSTRACT

The invention relates to a process for performing a aqueous synthesis of titanium phosphates (TiP) having solely —H2PO4 groups, which process is characterised by the following steps: providing titanium (IV) oxysulphate, TiOSO4, in an aqueous solution or in a powder and H2SO4, substantially without transition divalent metal ions, including cobalt (II) and copper (II), heating of the thus formed aqueous solution to above 50° C., but below 85° C. for at least 30 minutes, providing a controlled amount of H3PO4 to said aqueous solution, to form an aqueous solution containing a molar ratio between TIO2 and P2Os being controlled to about 1:1, not above 1:1.5 and not below 1:0.7, stirring the thus formed aqueous solution for at least 3 hours to form precipitates of titanium phosphate, and allowing ageing of said solution, without stirring, acidic washing of the formed precipitate using HCl or other acids to obtain TiO(OH)(H2PO4)-H2O having solely —H2PO4 ion-exchange chemical groups and allowing said precipitates to dry to a powder product, substituting protons in the powder product TiO(OH)(H2PO4)-H2O to sodium cations by treatment of the latter with solutions of sodium carbonate and allowing the thus formed powder of Na—TiP1 to dry.

14 Claims, 6 Drawing Sheets

(51) Int. Cl.
    *C01B 25/37*     (2006.01)
    *C02F 1/42*     (2006.01)

(52) U.S. Cl.
    CPC ...... *C01P 2002/72* (2013.01); *C01P 2002/86* (2013.01); *C02F 1/42* (2013.01); *C02F 2001/425* (2013.01)

(56) References Cited

OTHER PUBLICATIONS

Trublet et al, "Sorption performances of TiO(OH)(H2PO4) H2) in synthetic and mine waters," RSC Advances, 7, pp. 1989-2001 (Year: 2017).*

International Search Report and Written Opinion issued in PCT/SE2018/051115 dated Dec. 11, 2018; ISA/SE.

\* cited by examiner

PROCESS FOR A MILD AQUEOUS SYNTHESIS OF TITANIUM PHOSPHATES—ION—EXCHANGERS HAVING SOLELY—H2PO4 ACTIVE GROUPS

CROSS-REFERENCE TO RELATED APPLICATIONS

This application is a 371 U.S. National Phase of International Application No. PCT/SE2018/051115, filed Oct. 30, 2018, which claims priority to Swedish Patent Application No. 1751347-4, filed Oct. 31, 2017. The entire disclosures of the above applications are incorporated herein by reference.

TECHNICAL FIELD

The invention relates to a process for a mild aqueous synthesis of titanium phosphates (TiP) having solely —$H_2PO_4$ active groups and, therefore, a highest known for TiP ion-exchange capacity towards metal ions.

BACKGROUND

Recently, it has been demonstrated that synthesis of titanium phosphates (TiP) ion-exchangers having solely —$H_2PO_4$ active groups and, therefore, a highest known for TiP ion-exchange capacity, may be successfully performed at mild aqueous conditions, i.e. at relatively low temperatures and normal (1 atm) pressure in the presence of the "synthesis directing agents", cobalt(II) or other divalent transition metal ions (copper(II), etc.) and using a very specific source of titanium(IV) oxysulphate ($TiOSO_4$). However, cobalt(II) or other synthesis directing agents cause additional costs for reagents and post-synthetic utilisation and, therefore, it would be advantageous to find a synthetic process that may be performed without the use of cobalt(II) or other synthesis directing agents, at mild conditions, i.e. in aqueous solutions at relatively low temperatures and normal pressures and using different sources (liquid solutions and powders) of titanium (IV) oxysulphate ($TiOSO_4$).

Hence, there is a need of a process of performing a synthesis of titanium phosphate ion-exchangers having solely —$H_2PO_4$ active groups (called here as TiP1), which is efficient, but less demanding in terms of resources, energy and synthetic conditions than known processes and using a variety of different sources of titanium (IV) oxysulphate ($TiOSO_4$) for more universal approaches, which will be needed in the up-scaling of production of TiP1 for practical applications, i.e. for fine purification of process and drinking waters or concentrating and recovering of valuable metals from aqueous leachates.

SUMMARY OF THE INVENTION

It is an object of the present invention to provide a synthesis of titanium phosphates having solely —$H_2PO_4$ active groups, which is efficient, but less demanding in terms of resources than known processes.

The invention relates to a process for performing an aqueous synthesis of titanium phosphates having solely —$H_2PO_4$ active groups, which process is characterised by the following steps:

providing $TiOSO_4$, typically at a concentration of between 40 g/l and 130 g/l, in an aqueous solution or as a powder and $H_2SO_4$, typically at a concentration of between 330 g/l and 470 g/l, substantially without structure forming agents such as transition divalent metal ions, such as cobalt (II), copper (II), etc.

heating said aqueous solution to above 50° C., but below 85° C. for at least 30 minutes, providing a controlled molar amount of $H_3PO_4$ to said aqueous solution, to form an aqueous solution containing a molar ratio between $TiO_2$ and $P_2O_5$ that is controlled to about 1:1, not above 1:1.5, and not below 1:0.7, stirring the thus formed aqueous solution for at least 3 hours to form precipitates of titanium phosphates, and allowing ageing of said solution, without stirring, acidic washing of the formed precipitate using HCl or other acids to obtain $TiO(OH)(H_2PO_4).H_2O$ having solely —$H_2PO_4$ ion-exchange chemical groups and allowing said $TiO(OH)(H_2PO_4).H_2O$ to dry into a powder, substituting of exchangeable protons in said powder to sodium cations by treatment of the latter with solutions of sodium carbonate and allowing the thus formed powder of Na—TiP1 to dry.

The Na—TiP1 is Na—$TiO(OH)(H_2PO_4).H_2O$, where the $H_2PO_4$ may be exchanged in varying extent to $Na_2PO_4$ or $NaHPO_4$.

In a specific embodiment said heating of the aqueous solution is made at a temperature above 60° C.

In another specific embodiment said heating of the aqueous solution is made at a temperature below 80° C.

In a specific embodiment said heating of the aqueous solution is performed for at least 45 minutes.

In a specific embodiment the stirring of the aqueous solution is performed for at least 4 hours, preferably at least 5 hours.

Further, the stirred aqueous solution may be allowed to age for at least 2 hours, preferably at least 4 hours, without stirring.

In a specific embodiment, the step washing of the formed precipitates of titanium phosphates is performed with diluted HCl.

In a specific embodiment, said weight ratio between $TiO_2$ and $P_2O_5$ is controlled to lie between 1:1.1 and not below 1:0.9.

In a specific embodiment, the step of acidic washing of the formed precipitates of titanium phosphates is followed by a rinsing step, in which the precipitates are rinsed with distilled water giving rise to the powder product, a white powder with a chemical formula of: $TiO(OH)(H_2PO_4).H_2O$.

In a specific embodiment, exchangeable protons in the final product, $TiO(OH)(H_2PO_4).H_2O$ powder are substituted to sodium cations by treatment of the latter with solutions of disodium carbonate and allowing the powder to dry.

Other embodiments and advantages will be apparent from the detailed description and the appended drawings.

BRIEF DESCRIPTION OF DRAWINGS

An exemplary embodiment related to the invention will now be described with reference to the appended drawings, in which.

TiP1-SA1, (b) TiP1-SA2, (c) TiP1-SA3, (d) TiP1-SA4 and (e) TiP1-A. (*) denotes the presence of $H_3PO_4$.

Figure 3:
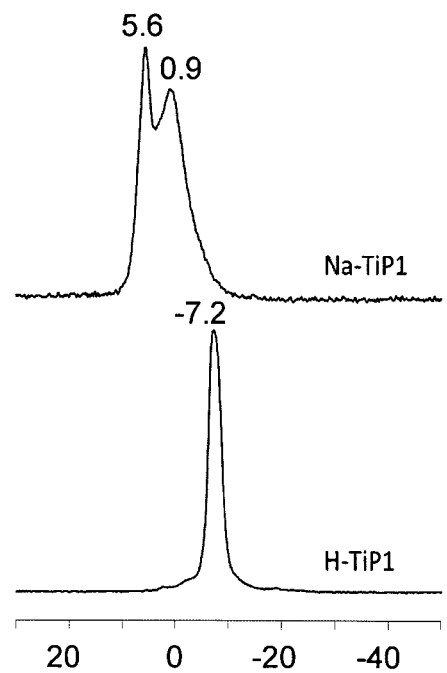

FIG. 3 shows solid-state $^{31}P$ MAS NMR spectra of Na—TiP1 and H—TiP1 powders.

Figure 4:
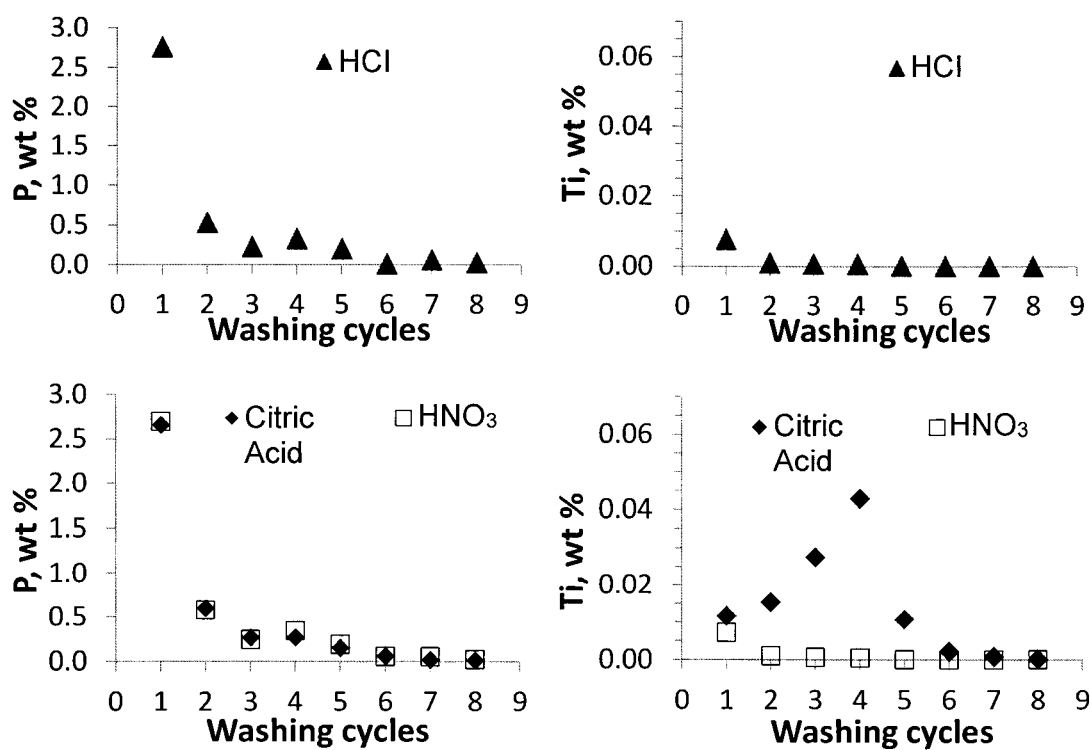

FIG. 4 shows phosphorus and titanium contents in the washing filtrates after post-synthetic treatment: with washing cycles 1 (0.5 M acid), 2-4 (0.1 M acid) and 5-8 (distilled water).

Figure 5:
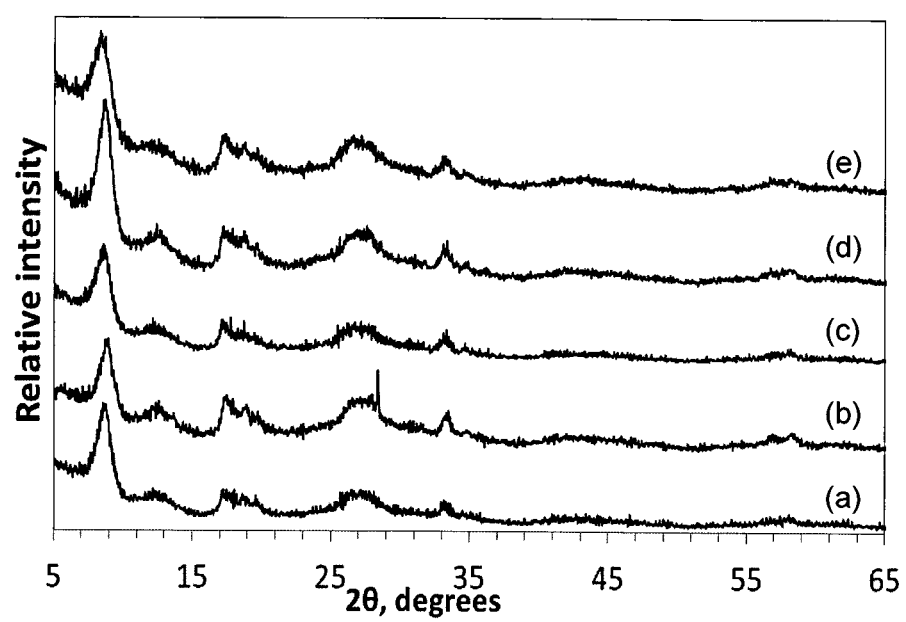

FIG. 5 shows powder XRD of (a) TiP1-SA1, (b) TiP1-SA2, (c) TiP1-SA3, (d) TiP1-SA4 and (e) TiP1-A.

Figure 6:
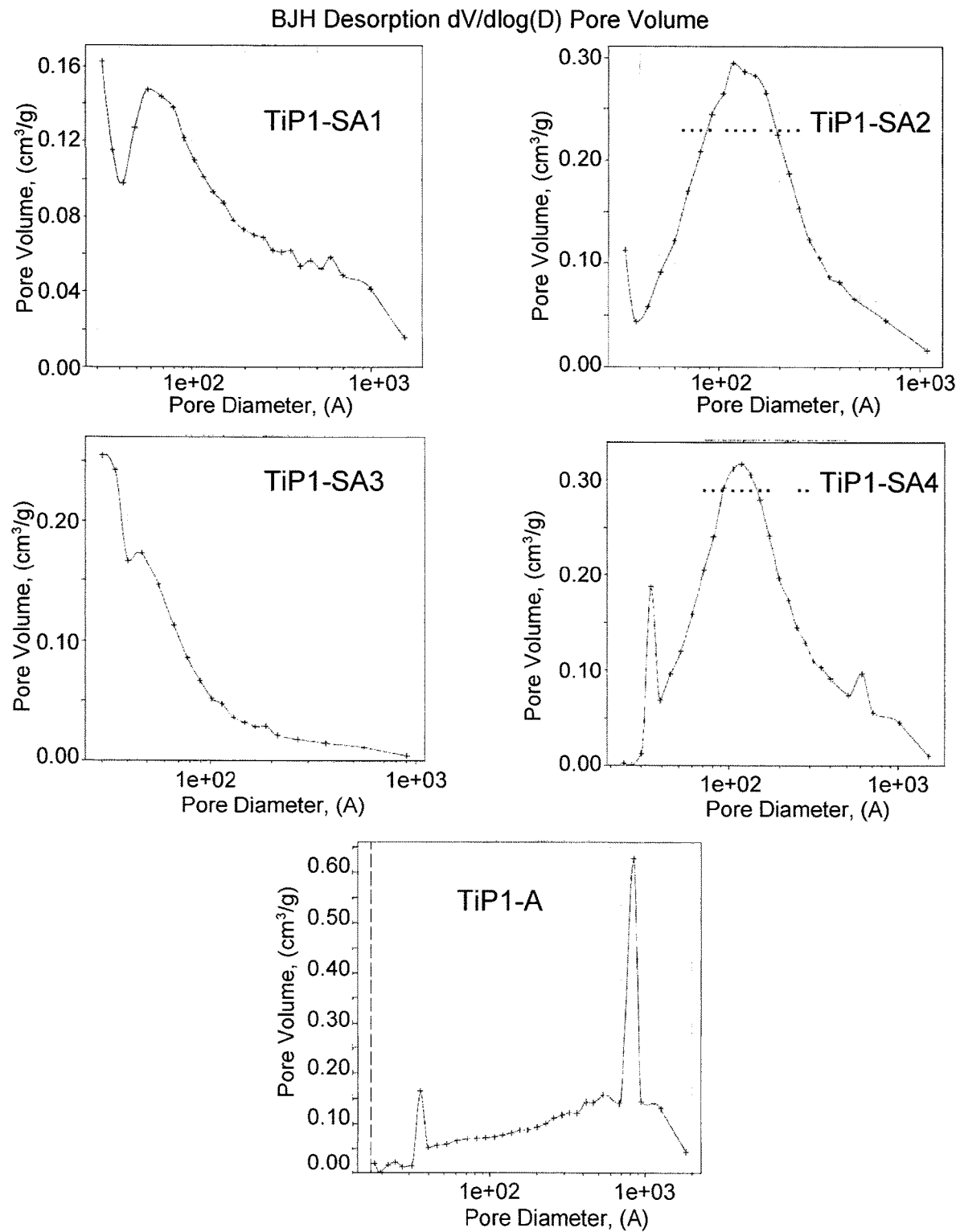

FIG. 6. shows pore size distribution of TiP1-SA1, TiP1-SA2, TiP1-SA3, TiP1-SA4 and TiP1-A.

Figure 7:
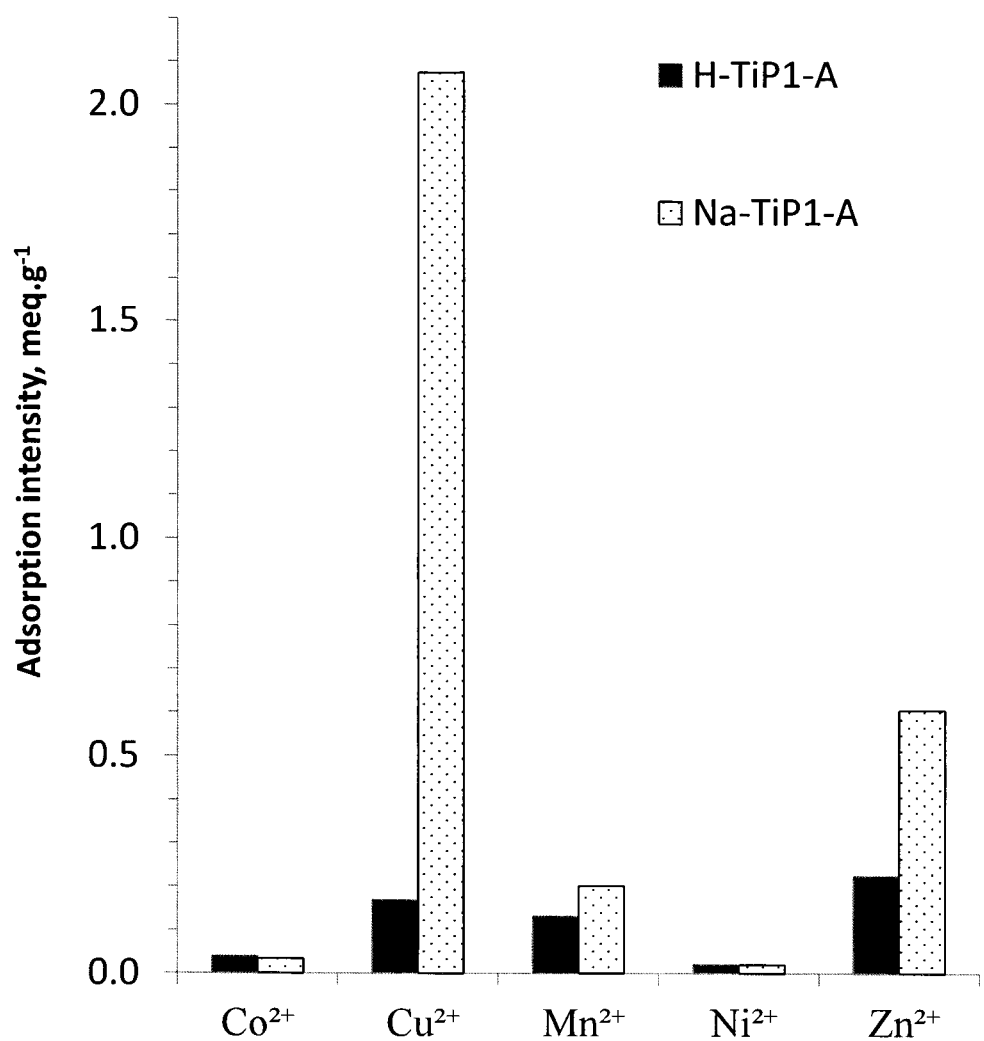

FIG. 7 shows selectivity of H—TiP1-A and Na—TiP1-A towards divalent ions ($Co^{2+}$, $Cu^{2+}$, $Mn^{2+}$, $Ni^{2+}$, $Zn^{2+}$). Sorption experiments were performed on a synthetic water (5 mM of each metal ions).

Figure 8:
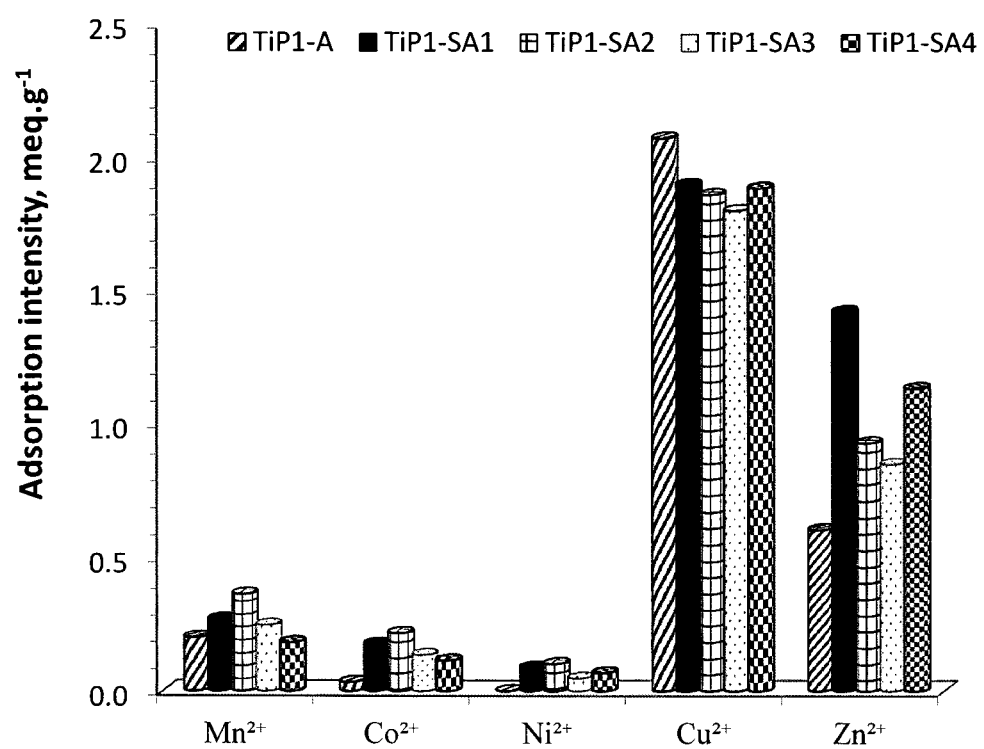

FIG. 8 shows selectivity of Na—TiP1 towards divalent ions ($Mn^{2+}$, $Co^{2+}$, $Ni^{2+}$, $Cu^{2+}$ and $Zn^{2+}$). Sorption in a synthetic water (5 mM of each metal ions).

DETAILED DESCRIPTION OF EMBODIMENTS

Titanium phosphates (TiP) form a group of inorganic ion-exchangers that have the particular quality of being stable in a wide pH range (from pH 2 to 10), with physico-chemical and structural properties that can be adjusted by changing synthesis conditions [M. Trublet, M. V. Maslova, D. Rusanova and O. N. Antzutkin, RSC Adv., 2017, 7, 1989-2001; X. Wang, X. Yang, J. Cai, T. Miao, L. Li, G. Li, D. Deng, L. Jiang and C. Wang, J. Mater. Chem. A, 2014, 2, 6718-6722; M. V. Maslova, D. Rusanova, V. Naydenov, O. N. Antzutkin and L. G. Gerasimova, J. Non. Cryst. Solids, 2012, 358, 2943-2950; M. Kapnisti, A. G. Hatzidimitriou, F. Noli and E. Pavlidou, J. Radioanal. Nucl. Chem., 2014, 302, 679-688; A. S. Chugunov, M. V. Maslova and L. G. Gerasimova, Radiochemistry, 2012, 54, 549-557.] Recent articles have further revealed high selectivity towards transition metals and radioactive ions, as well as excellent thermal and radiation stability [M. Trublet, M. V. Maslova, D. Rusanova and O. N. Antzutkin, RSC Adv., 2017, 7, 1989-2001; M. Kapnisti, A. G. Hatzidimitriou, F. Noli and E. Pavlidou, J. Radioanal. Nucl. Chem., 2014, 302, 679-688; M. V. Maslova, D. Rusanova, V. Naydenov, O. N. Antzutkin and L. G. Gerasimova, Inorg. Chem., 2008, 47, 11351-11360; M. V. Maslova, L. G. Gerasimova and R. F. Okhrimenko, Glas. Phys. Chem., 2011, 37, 65-71; A. Clearfield, A. I. Bortun, S. A. Khainakov, L. N. Bortun, V. V Strelko and V. N. Khryaschevskii, Waste Manag., 1998, 18, 203-210.]

The types of ion-exchange groups that can be found in TiP matrices are —$HPO_4$, —$H_2PO_4$ or a mixture of both. The presence and the amount of both exchangeable (—$HPO_4$ and —$H_2PO_4$) units depends greatly on synthesis conditions, namely (i) titanium sources, (ii) temperature, (iii) Ti(IV)-speciation and the amount of $H_2SO_4$, (iv) the Ti:P ratio, (v) reaction time and (vi) post-synthetic treatments [W. Zhang, R. Koivula, E. Wiikinkoski, J. Xu, S. Hietala, J. Lehto and R. Harjula, ACS Sustain. Chem. Eng., 2017, 5, 3103-3114].

One of the first fully characterised TiP ion-exchangers is alpha-TiP, $Ti(HPO_4)H_2O$. This sorbent is entirely composed of —$HPO_4$ ion-exchange units and is crystalline. It was at first mainly synthesised using titanium(III) or titanium(IV) chloride as the main titanium source [A. Clearfield and D. S. Thakur, Appl. Catal., 1986, 26, 1-26; A. Bortun, E. Jaimez, R. Llavona, J. García and J. Rodriguez, Mater. Res. Bull., 1995, 30, 413-420; B. B. Sahu and K. Parida, J. Colloid Interface Sci., 2002, 248, 221-230.] Later, other studies showed that it is possible to synthesise crystalline α-TiP using $TiO_2$ (anatase) [J. Soria, J. E. Iglesias and J. Sanz, J. Chem. Soc. Faraday Trans., 1993, 89, 2515-2518; S. Bruque, M. A. G. Aranda, E. R. Losilla, P. Olivera-Pastor and P. Maireles-Torres, Inorg. Chem., 1995, 34, 893-899.] and tetrabutyl titanate [X. Wang, X. Yang, J. Cai, T. Miao, L. Li, G. Li, D. Deng, L. Jiang and C. Wang, J. Mater. Chem. A, 2014, 2, 6718-6722.] Points in common among these studies are the molar ratio between $P_2O_5$ and $TiO_2$, greater than 1:1, and harsh synthesis conditions. Observations showed that for the smallest molar ratios reported for α-TiP ($P_2O_5$:$TiO_2$=1.2:1), it was relatively difficult to achieve synthesis, which, in one instance, required maintaining a temperature of 200° C. for 3 hours in an autoclave [J. Soria, J. E. Iglesias and J. Sanz, J. Chem. Soc. Faraday Trans., 1993, 89, 2515-2518.] When the molar ratio was much greater ($P_2O_5$:$TiO_2$=14.6:1), neither heating nor autoclave were used, but the mixture required refluxing for three days [S. Bruque, M. A. G. Aranda, E. R. Losilla, P. Olivera-Pastor and P. Maireles-Torres, Inorg. Chem., 1995, 34, 893-899.] Other synthesis procedures with $P_2O_5$:$TiO_2$ molar ratios greater than 1:1 reported low heating (between 50 and 80° C.) with an extended reaction time (from 12 h to 4 days) and/or under refluxing conditions [X. Wang, X. Yang, J. Cai, T. Miao, L. Li, G. Li, D. Deng, L. Jiang and C. Wang, J. Mater. Chem. A, 2014, 2, 6718-6722; A. Clearfield and D. S. Thakur, Appl. Catal., 1986, 26, 1-26; B. B. Sahu and K. Parida, J. Colloid Interface Sci., 2002, 248, 221-230.] To the best of our knowledge, no data have been reported for synthesis of α-TiP materials using $TiOSO_4$ as a titanium source. Furthermore, there are no studies demonstrating that using the same titanium source (under slightly different and mild synthesis conditions), could readily result in the formation of crystalline α-TiP or amorphous TiP, independently.

It has been shown that the presence of two exchangeable protons considerably increased the ion-exchange capacity of TiP (by a factor of two to three) towards transition metal ions in comparison to —$HPO_4$ based TiP [M. Trublet, M. V. Maslova, D. Rusanova and O. N. Antzutkin, RSC Adv., 2017, 7, 1989-2001.] Another important criterion is the degree of crystallinity/amorphousness of the TiP ion-exchangers. In the literature, it appears that the amorphous nature of TiP systems may be related to their greater surface area and hence their higher sorption capacity [M. Trublet, M. V. Maslova, D. Rusanova and O. N. Antzutkin, Mater. Chem. Phys., 2016, 183, 467-475.]

A major challenge with amorphous TiP systems is to design a consistent synthesis procedure that would lead to a compound displaying an unvarying chemical formula and strong sorption characteristics while maintaining the low crystallinity of the material. There is a need for methodical and reproducible synthetic routes of amorphous titanium phosphates featuring stable and controllable steps. A few examples of similar syntheses of amorphous TiP and suggestions of their fluctuating chemical compositions are:

$Ti(OH)_{1.36}(HPO_4)_{1.32} \cdot 2.3H_2O$ [M. V. Maslova, D. Rusanova, V. Naydenov, O. N. Antzutkin and L. G. Gerasimova, Inorg. Chem., 2008, 47, 11351-11360.];

$Ti(OH)_{1.2}(HPO_4)_{1.28}(H_2PO_4)_{0.24} \cdot 2.5H_2O$ [M. V. Maslova, A. S. Chugunov, L. G. Gerasimova and N. V. Konovalova, Radiochemistry, 2013, 55, 392-398.], $TiO_{1.25}(OH)_{0.47}(H_2PO_4)_{0.77}(HPO_4)_{0.13} \cdot 2.3H_2O$ [A. I. Bortun, L. N. Bortun, A. Clearfield, S. A. Khainakov, V. V. Strelko, V. N. Khryashevskii, A. P. Kvashenko and I. I. Voitko, Solvent Extr. Ion Exch., 1997, 15, 515-532.] and $TiO_{1.1}(OH)_{0.58}(HPO_4)_{0.2}(H_2PO_4)_{0.8} \cdot 0.64H_2O$ [W. Zhang, R. Koivula, E. Wiikinkoski, J. Xu, S. Hietala, J. Lehto and R. Harjula, *ACS Sustain. Chem. Eng.*, 2017, 5, 3103-3114.]

A recently published amorphous TiP of chemical formula, $TiO(OH)(H_2PO_4) \cdot H_2O$ (so called TiP1), demonstrated exceptionally good sorption properties towards divalent transition metal ions. This TiP1 is composed of solely —$H_2PO_4$ groups, making it easier to identify P-units [M. Trublet, M. V. Maslova, D. Rusanova and O. N. Antzutkin, *RSC Adv.*, 2017, 7, 1989-2001; M. Trublet, M. V. Maslova, D. Rusanova and O. N. Antzutkin, *Mater. Chem. Phys.*, 2016, 183, 467-475.] In the latter two articles, a $TiOSO_4$ source from the Apatity mine (Russia), $CoSO_4$ as a matrix directing agent and HCl washings as a post-synthetic treatment were used. The $P_2O_5:TiO_2$ molar ratio was close to 1:1 and synthesis was achieved without requiring harsh conditions (namely, at 80° C. for 30 min in aqueous solutions at normal pressure, 1 atm). It is known that different $TiOSO_4$ solutions are used to produce $TiO_2$-based white pigments and the same solutions could also be, therefore, used for TiP1 synthesis.

This embodiment focuses on obtaining one type of sorbent, namely amorphous $TiO(OH)(H_2PO_4) \cdot H_2O$ (TiP1) using five different $TiOSO_4$ sources featuring various grades of purity (from the Apatity mine technical grade to synthetic grade), different levels of titanium content and different physical states (powders and solutions). The synthetic steps described in this embodiment are somewhat stringent, ensuring high reproducibility and a high level of control. The influence of acidic washings during the post-synthetic treatment on the synthesised TiP materials was also studied. Each ion-exchanger obtained was characterised through solid-state $^{31}P$ MAS NMR, XRD, BET and chemical analyses. The $Na^+$ uptake and the sorption of a divalent mixture (synthetic water) were also investigated and results described in detail below in this embodiment.

Syntheses

Figure 1:
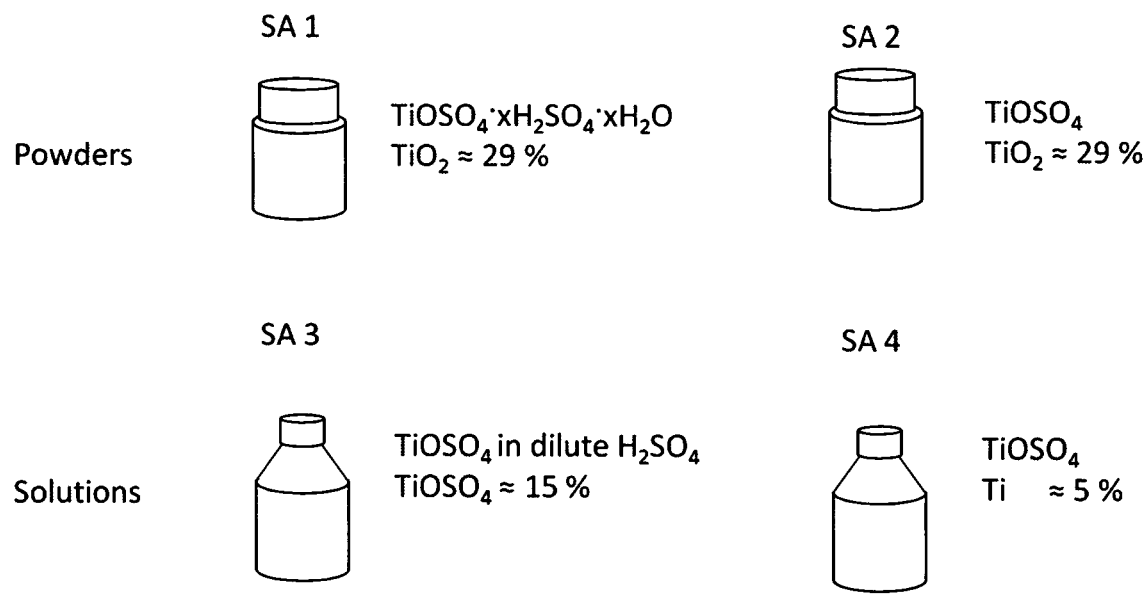
FIG. 1 shows different commercially available sources of the titanium (IV) oxysulphate chemicals (powders and solutions) used in the synthesis of the $TiO(OH)(H_2PO_4).H_2O$ material.

The influence of different titanium sources (see FIG. 1) on the synthesis of $TiO(OH)(H_2PO_4) \cdot H_2O$ (TiP1) has been thoroughly studied. All the titanium(IV) oxysulphate chemicals (powders and solutions) available at Sigma, Sigma-Aldrich and Fluka as well as one technical-grade $TiOSO_4$ solution, namely, a leachate of titanite (Apatity, Russia) were tested. The sources featured different chemical grades and different $TiO_2$ and $H_2SO_4$ contents (see FIG. 1). Syntheses were accomplished using a method similar to that described in Trublet et al. [M. Trublet, M. V. Maslova, D. Rusanova and O. N. Antzutkin, *Mater. Chem. Phys.*, 2016, 183, 467-475.], but without the cobalt ions originally thought to be used as a structure-modifying agent. The $TiO_2$ and $H_2SO_4$ contents in the $TiOSO_4$ sources were adjusted to meet the same ranges as the $TiOSO_4$ solution (82.4 g·L$^{-1}$ $TiO_2$ and 542.7 g·L$^{-1}$ $H_2SO_4$) used by Trublet et al. and also used in this study as source A [M. Trublet, M. V. Maslova, D. Rusanova and O. N. Antzutkin, *RSC Adv.*, 2017, 7, 1989-2001; M. Trublet, M. V. Maslova, D. Rusanova and O. N. Antzutkin, *Mater. Chem. Phys.*, 2016, 183, 467-475.]

Synthesis of TiP1-A

The first source of $TiOSO_4$ (called "A" in this specification) was the solution used in the synthesis reported in refs. [M. Trublet, M. V. Maslova, D. Rusanova and O. N. Antzutkin, *RSC Adv.*, 2017, 7, 1989-2001; M. Trublet, M. V. Maslova, D. Rusanova and O. N. Antzutkin, *Mater. Chem. Phys.*, 2016, 183, 467-475.] In this case, 50 mL of the $TiOSO_4$ leachate ($TiO_2 \approx 7$ wt %) from Apatity was heated to 80° C. and mixed with 17 mL of 1 M $H_2SO_4$ for 30 minutes. The mixture was combined with the corresponding amount of 85% $H_3PO_4$ (7 mL), to keep the molar ratio of $P_2O_5:TiO_2$ close to 1:1, and the heat was switched off. Stirring was then maintained in ambient conditions for another 5 hours. The post-synthetic treatment, consisting of several washings using hydrochloric acid and deionised water, was carried out following the procedure described by Trublet et al. [M. Trublet, M. V. Maslova, D. Rusanova and O. N. Antzutkin, *Mater. Chem. Phys.*, 2016, 183, 467-475.] The resulting precipitate was dried at 60° C. and then washed successively with 0.5 M HCl and 0.1 M HCl (three times). Washing continued with deionised water until pH≈4.0. The overall washing process contained eight steps and will be discussed further in the section "Post-synthetic treatment (example of TiP1-A)".

Synthesis of TiP1-SA1

The titanium source used for synthesis of TiP1-SA1 was a synthetic-grade powder from Aldrich formulated as $TiOSO_4 \cdot xH_2SO_4 \cdot xH_2O$ ($TiO_2 \approx 29$ wt %). In this case, 5.2 g of powder were dissolved in 5 mL of conc. $H_2SO_4$ and heated to 80° C. The mixture was poured into 25 mL of deionised water and 2.5 mL of 85% $H_3PO_4$ was added, giving a molar ratio of $P_2O_5:TiO_2=1:1$. The heat was then switched off and the procedure continued as described for TiP1-A.

Synthesis of TiP1-SA2

A technical-grade $TiOSO_4$ powder ($TiO_2 \approx 29$ wt %) from Sigma-Aldrich (SA2) was used as the source of titanium. About 5.0 g of powder were dissolved in 5 mL conc. $H_2SO_4$ and heated to 80° C. The mixture was added to 17 mL deionised water and 2.5 mL 85% $H_3PO_4$ was then added. The next steps of synthesis were performed using the same procedure as for TiP1-A.

Synthesis of TiP1-SA3

In this experiment, 50 mL of a $TiOSO_4$ solution ($TiO_2 \approx 7$ wt %) in dilute sulphuric acid from Aldrich (SA3) was mixed with 10 mL of conc. $H_2SO_4$ and was then heated to 80° C. As for the other synthesis procedures, 7.8 mL of 85% $H_3PO_4$ was added to the mixture and synthesis was performed in the same manner as TiP1-A.

Synthesis of TiP1-SA4

This synthesis was performed using 50 mL of $TiOSO_4 \cdot xH_2SO_4$ solution ($TiO_2 \approx 8$ wt %) from Fluka (SA4), heated to 80° C., with 9.3 mL of 85% $H_3PO_4$ added to reach a molar ratio of $P_2O_5:TiO_2=1:1$. The synthesis procedure followed the same steps as the TiP1-A synthesis.

The synthesis conditions for the different sources of $TiOSO_4$ are summarised in Table 1.

TABLE 1

Synthesis conditions for TiP1 sorbents synthesised using different titanium sources

| Ti source name | Source | Initial $TiO_2$ content | State | $[TiO_2]_i$ g/L | $[H_2SO_4]_i$ g/L | Yield* % |
|---|---|---|---|---|---|---|
| A | Apatity, Russia | ~7 wt % | Liquid | 62 | 405 | 89 |
| SA1 | Aldrich | ~29 wt % | Powder | 60 | 441 | 64 |
| SA2 | Sigma-Aldrich | ~29 wt % | Powder | 66 | 397-410 | 65 |
| SA3 | Aldrich | ~7 wt % | Liquid | 76 | 394 | 71 |
| SA4 | Fluka | ~8 wt % | Liquid | 110 | 356-409 | 95 |

[ ]$_i$: Concentration before adding $H_3PO_4$ during the synthesis process.
*Calculated based on the initial titanium concentration.

Sample Characterisation

The resulting white solids were characterised using solid-state $^{31}P$ MAS NMR, XRD and elemental analysis. The solid-state $^{31}$P magic-angle-spinning (MAS) NMR spectra were obtained at 162.01 MHz on a Bruker Ascend Aeon WB 400 spectrometer ($B_0$=9.48 T) using a 4 mm MAS probe and the samples were packed in standard $ZrO_2$ rotors. The spinning frequency was set to 12 kHz and all spectra were externally referenced to solid $NH_4H_2PO_4$ at 0.9 ppm. All data are reported with chemical shifts related to 85% $H_3PO_4$ at 0 ppm and single-pulse experiments were used to investigate the samples. The pulse width and the pulse delay were 1.5 µs and 5 s, respectively. Spectra were obtained through accumulation of 64 acquisitions. The NMR spectra were processed and analysed using Topspin 3.5 software.

The powder X-ray diffraction (PXRD) patterns were recorded using a PANalytical Empyrean diffractometer run in Bragg-Brentano geometry with Cu Kα radiation (λ=1.5406 Å). The samples were scanned in the 2θ range of 2-70° with a 2θ step size of 0.0260° and a scan step time of 3.3 min.

The BET surface properties and the porosity of the TiP1 materials synthesised in this specification were determined using the nitrogen adsorption/desorption method at 77 K with a Micrometrics ASAP 2000 surface-area analyser. Prior to taking measurements, the samples were degassed at relatively low temperature (383.15 K) for about 24 h to avoid any structural changes. The pore-size distribution was estimated by means of the BJH method using the desorption branches of the isotherms.

The $P_2O_5$:$TiO_2$ molar ratio of the titanium phosphate products was determined through inductively coupled plasma-sector field mass spectrometry (ICP-SFMS). Prior to this analysis, the samples were digested in a mixture of HF—$HNO_3$—HCl. The percentages of chlorine and sulphate species in the final TiP1 were also measured and were found negligibly small.

Sorption Experiments

The maximum sorption capacity of the TiP1 sorbents was determined based on sodium uptake. The TiP1 materials in their proton forms were mixed with 0.5 M $Na_2CO_3$ ($m_{TiP1}$ (g): $V_{Na_2CO_3}$ (mL)=1:50). The suspensions were kept under constant stirring at ambient conditions before being filtered. The sodium content of the filtrates was determined using ICP-AES (ALS Scandinavia AB, Lulea) and was further used to calculate the sodium uptake of the sorbents. The resulting solids were rinsed with deionised water until pH≈5-6 and dried at 60° C. for 6 hours. A comparison of the sorption properties of TiP1 sorbents obtained in the form of sodium (Na—TiP1) and proton (H—TiP1) towards a mixture of transition metal ions was made. This mixture consisted of 5 mmol of five different metal salts ($ZnSO_4.7H_2O$, $CuSO_4.5H_2O$, $MnSO_4H_2O$, $CoSO_4.7H_2O$ and $NiSO_4.7H_2O$) mixed in one litre of deionised water. The mass (g) to volume (mL) ratio between each studied sorbent and the solution of metal ions was 1:200. The concentration of each metal ion was determined before and after the sorption experiments.

Solid-State $^{31}$P MAS NMR Measurements

Figure 2:
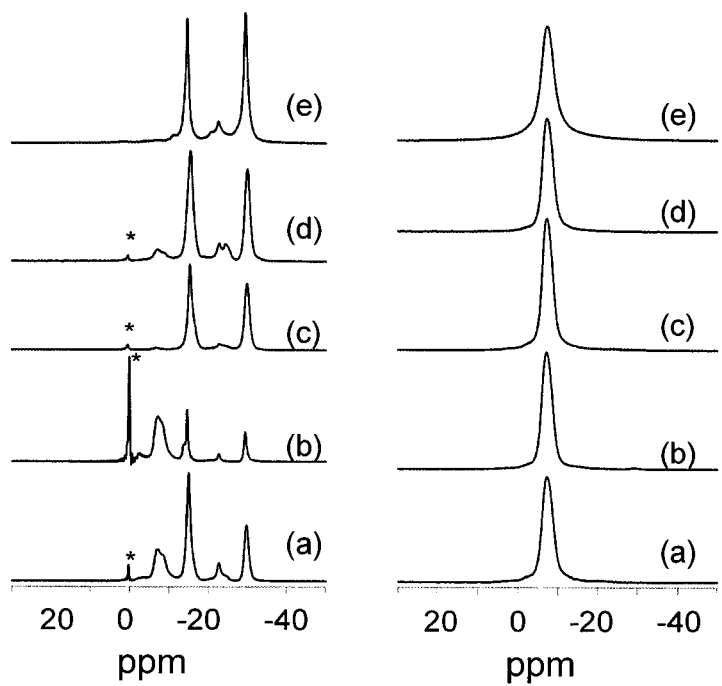
FIG. 2 shows solid-state $^{31}P$ MAS NMR spectra of powder samples of titanium phosphates before washing (left) and final powder samples after washing (right) of (a)

The $^{31}$P MAS NMR spectra of all synthesised TiP1 samples before and after washing are displayed in FIG. 2. The different chemical shifts observed in the spectra are due to the presence of $^{31}$P nuclei in different chemical environments. It has been reported that the resonance lines of $H_2PO_4$ groups in TiP matrices are expected to lie between −5 and −11 ppm. The resonance lines appearing up to −25 ppm are attributed to —$HPO_4$ groups, while the ones between −25 and −35 ppm are assigned to —$PO_4$ groups [A. I. Bortun, J. García, T. A. Budovitskaya, V. V. Strelko and J. Rodriguez, Mater. Res. Bull., 1996, 31, 487-496; Y. Li and M. Whittingham, Solid State Ionics, 1993, 63-65, 391-395; Y. Bereznitski, M. Jaroniec, A. Bortun, D. Poojary and A. Clearfield, J. Colloid Interface Sci., 1997, 191, 442-448; H. Takahashi, T. Oi and M. Hosoe, J. Mater. Chem., 2002, 12, 2513-2518.] It has also been shown that any poly/pyrophosphate groups are observed in the range of ca −35 to −55 ppm [S. del Val, M. L. Granados, J. L. Fierro, J. Santamaria-González, A. J. López and T. Blasco, J. Catal., 2001, 204, 466-478.] More than one resonance line can be observed in the same range due to small differences in the geometry of the $^{31}$P local environments.

The spectra of the samples before washing (FIG. 2, left) display two intense resonance lines at ca −15.0 and −29.7 ppm and one low intense resonance line at −22.9 ppm, which are attributed to the presence of —$HPO_4$ and —$PO_4$ groups. In the spectra on FIGS. 2(a), 2(b), 2(c) and 2(d) before washing, a narrow resonance line at 0 ppm is also observed and is assigned to the presence of $H_3PO_4$, due to insufficient rinsing of the precipitate before washings with HCl.

In the spectra on FIGS. 2(a), 2(b) and 2(d) before washing, a broad resonance line centred at −7.1 ppm can be distinguished and is attributed to the presence of —$H_2PO_4$ groups. This is most likely related to the presence of the final material (entirely composed of —$H_2PO_4$ groups) in the powder. These data are in very good agreement with data reported by Trublet et al. for synthesis achieved using cobalt ions, where three resonance lines at −14.5, −22.2 and −29.6 ppm and a small shoulder at −7.5 ppm were observed before washing [M. Trublet, M. V. Maslova, D. Rusanova and O. N. Antzutkin, Mater. Chem. Phys., 2016, 183, 467-475.] Similar $^{31}$P MAS NMR spectra were also reported by Bortun et al. for two types of raw TiP materials, where two narrow resonance lines were recorded at −10.8 and −24.3 ppm and at −12.3 and −26.0 ppm, although the $^{31}$P NMR assignments in these cases are questionable [A. I. Bortun, S. A. Khainakov, L. N. Bortun, D. M. Poojary, J. Rodriguez, J. R. Garcia and A. Clearfield, Chem. Mater., 1997, 9, 1805-1811.] The spacing (in ppm) between these two resonance lines is somewhat similar to that observed for the studied TiP1 materials before washing (FIG. 2, left), suggesting that two differently coordinated $^{31}$P-sites and different amounts of water molecules are present in the materials.

The $^{31}$P MAS NMR spectra of the final TiP1 products in FIG. 2, right (after washing with HCl and deionised water) reveal a single resonance line centred at ca −7.3 ppm for each case. This confirms that all the final TiP1 products are entirely composed of —$H_2PO_4$ groups and that all types of phosphate groups are fully protonated to —$H_2PO_4$ in the final products. A similar observation was made for a TiP1 final compound, synthesised using the A-source. In our previous work we also reported that the presence of —$H_2PO_4$ groups became more and more predominant after each washing step, leading to a single resonance line at −7.5 ppm for the final product, while the resonance lines for the other phosphate groups (—$HPO_4$ and —$PO_4$) displayed decreasing intensity with each successive washing cycle [M. Trublet, M. V. Maslova, D. Rusanova and O. N. Antzutkin, Mater. Chem. Phys., 2016, 183, 467-475.]

The $^{31}$P MAS NMR spectra of the sodium forms were also recorded and are shown in FIG. 3. The $^{31}$P MAS NMR spectrum of Na—TiP1 displays a broad resonance line with two resonances at 5.6 and 0.9 ppm, corresponding to chemically inequivalent phosphorus sites. Some publications indicate that the sodium exchange could not reach the 100% yield in TiP matrices due to the coexistence of different phases during uptake of $Na^+$ on TiP1 [M. Trublet, M. V. Maslova, D. Rusanova and O. N. Antzutkin, RSC Adv., 2017, 7, 1989-2001; A. Clearfield, A. I. Bortun, S. A. Khainakov, L. N. Bortun, V. V Strelko and V. N. Khryaschevskii, *Waste Manag.*, 1998, 18, 203-210; W. Zhang, R. Koivula, E. Wiikinkoski, J. Xu, S. Hietala, J. Lehto and R. Harjula, *ACS Sustain. Chem. Eng.*, 2017, 5, 3103-3114; A. I. Bortun, L. N. Bortun, A. Clearfield, S. A. Khainakov, V. V. Strelko, V. N. Khryashevskii, A. P. Kvashenko and I. I. Voitko, *Solvent Extr. Ion Exch.*, 1997, 15, 515-532; H. Takahashi, T. Oi and M. Hosoe, *J. Mater. Chem.*, 2002, 12, 2513-2518.] For α-TiP, it has been reported that in similar conditions, three different phases coexisted: α-Ti(HPO$_4$)$_2$, α-Ti(HPO$_4$)(NaPO$_4$) and α-Ti(NaPO$_4$)$_2$. Therefore, it can be expected that when the sodium exchange occurs, some of the phosphate groups are fully exchanged to Na$_2$PO$_4$, some are partially exchanged to NaHPO$_4$ and the most inaccessible sites remain in the H$_2$PO$_4$ form. The $^{31}$P NMR resonance lines of Na—TiP1 appear at higher resonance frequencies (larger ppm) due to the deshielding effect of sodium ions (see FIG. 3) as in other sodium and potassium phosphates [B. B. Johnson, A. V. Ivanov, O. N. Antzutkin and W. Forsling, *Langmuir* 18 (2002) 1104-1111]. The presence of three different phosphate groups in this sorbent is correlated with the broadening of the $^{31}$P NMR resonance line. This is in agreement with the reported and suggested mechanism of sodium uptake on TiP1 [M. Trublet, M. V. Maslova, D. Rusanova and O. N. Antzutkin, *RSC Adv.*, 2017, 7, 1989-2001.]

Post-Synthetic Treatment (Example of TiP1-A)

To gain a better understanding of the processes occurring during washing, acidic washings on TiP1 materials were performed using three different acids, HCl, HNO$_3$ and citric acid. The phosphate and titanium contents in the filtrates were measured and are presented in FIG. 4 (top) for HCl and in FIG. 4 (bottom) for citric acid and HNO$_3$. Very similar trends are observed for the three acids of interest. About 3.0 wt % of the phosphate species are released during the first stage of the washing process (i.e. with 0.5 M acid) before decreasing to 0.5-0.3 wt % when successive washings with 0.1 M acid are performed. The phosphorus content in the filtrates reaches ca 0% after the fifth cycle. This phenomenon can be explained by the presence of H$_3$PO$_4$ on the surface of the material, which, for the most part, is washed away during the first stages of the acid treatment. This is confirmed by the $^{31}$P NMR spectra, where the resonance line attributed to H$_3$PO$_4$ is observed in the sample before washing and decreases with each washing.

In each case, FIG. 4 shows that the titanium content determined in the filtrates does not go beyond 0.05%. For the HCl and HNO$_3$ post-synthetic treatments, the maximum amount of titanium in the filtrates (about 0.01%) is detected for the first washing with 0.5 M of acid. This small amount may be explained by residual oxo-titanium species on the surface of the TiP1 materials that are being washed away and/or by errors induced during analytical measurements.

In the case of citric acid, the titanium content is slightly higher (up to 0.05%) than for HCl and HNO$_3$ (up to 0.01%), due to the possible complexation of titanium(IV) with citric acid [J. M. Collins, R. Uppal, C. D. Incarvito and A. M. Valentine, *Inorg. Chem.*, 2005, 44, 3431-3440]. Overall, the hydrolysis of titanium species remains negligible (0.00-0.05%) throughout the entire washing process.

Only the data related to TiP1-A are shown in this specification, but similar behaviour was recorded for the other TiP1 materials. Therefore, one can conclude that both organic and inorganic acids can be used for post-synthetic treatment of TiP1 and results show that three cycles of acidic washing appear to be sufficient, ensuring the release of minimal amounts of phosphorus and titanium. This analysis also confirms that the protonation of phosphate groups on the TiP1 surfaces is independent of the type of acid used.

XRD

The XRD diffractograms of TiP1 final (after complete washing cycles) samples are displayed in FIG. 5. The TiP1 features in the diffractograms are similar for all samples in this study, where one main peak is observed at ca 2θ=8.5°, corresponding to an interlayer distance of ca 10.4 Å. It has been reported that such data is an indication of a layered structure with low crystallinity [H. Takahashi, T. Oi and M. Hosoe, *J. Mater. Chem.*, 2002, 12, 2513-2518; L. Körösi, S. Papp and I. Dékány, *Chem. Mater.*, 2010, 22, 4356-4363.] The comparably similar broadness of the peaks also confirms the amorphous nature of the sorbents. It can, therefore, be concluded that TiP1-type sorbents with analogue amorphousness and/or crystallinity are obtained when these five different titanium sources are used.

Elemental Analyses

TABLE 2

Elemental analysis data of the solid phase content for titanium phosphate products

|  | Calculated | TiP1-A | TiP1-SA1 | TiP1-SA2 | TiP1-SA3 | TiP1-SA4 |
|---|---|---|---|---|---|---|
| TiO$_2$, wt % | 40.8 | 41.0 | 40.2 | 39.5 | 41.7 | 42.0 |
| P$_2$O$_5$, wt % | 36.2 | 37.1 | 33.2 | 37.3 | 33.2 | 34.6 |
| Ti/P molar ratio | 1.0 | 1.0 | 1.1 | 0.9 | 1.1 | 1.1 |

Table 2 gives the amounts of TiO$_2$ and P$_2$O$_5$ found in the various TiP1 samples using elemental analyses. The theoretical values calculated for the chemical formula: TiO(OH)(H$_2$PO$_4$)H$_2$O give 40.8 and 36.2 wt % of TiO$_2$ and P$_2$O$_5$, respectively. These numbers also correspond to theoretical 1:1 molar ratio of Ti:P in TiP1.

The resulting TiO$_2$ and P$_2$O$_5$ content in the differently synthesised TiP1 materials are in the same range as the values previously obtained by Trublet et al. for (Co)TiP1 (40.2% TiO$_2$ and 36.9% P$_2$O$_5$) [M. Trublet, M. V. Maslova, D. Rusanova and O. N. Antzutkin, *Mater. Chem. Phys.*, 2016, 183, 467-475.] The difference in the theoretical and experimental percentages of P and Ti observed in some of the samples can be partly explained by flaws in the experimental procedure used for their determination (incomplete opening of inorganic powders by strong acids used in the ICP-MS analysis).

Considering the characterisation data ($^{31}$P MAS NMR, XRD, elemental analysis) as well as the synthesis conditions (summarised in Table 1), it can be stated that TiO(OH)(H$_2$PO$_4$)H$_2$O sorbent can be successfully synthesised in each case when the synthesis conditions (i.e. concentration of Ti and acidity) are kept within the corresponding ranges. The titanium and sulphuric acid ratios in the TiOSO$_4$ powders/solutions should be adjusted (if needed) using concentrated H$_2$SO$_4$ and/or deionised water and the molar ratio P$_2$O$_5$:TiO$_2$ ratio should be kept close to 1:1. The H$_2$SO$_4$ content before adding H$_3$PO$_4$ should be around 400±50 g/L, while the titanium content may vary. However, the titanium content (in g/L) in the primary solution (before adding H$_3$PO$_4$) should not be lower than 60 g/L, so that the TiP1 precipitate can form under these acidic conditions.

The sorption properties of the newly synthesised sorbents were also studied and compared to other data to determine whether sorption behaviour was influenced by the type of titanium source used.

BET and Sorption Characteristics

TABLE 3

Surface features (SA-surface area, $S_{external}$-external surface area, $D_{average}$-average pore diameter, $V_{pore}$-pore volume) and sorption characteristics of TiP1 sorbents.

| Ti source name | SA, $m^2 \cdot g^{-1}$ | $S_{external}$, $m^2 \cdot g^{-1}$ | $D_{average}$, nm | $V_{pore}$, $cm^3 \cdot g^{-1}$ | $Na^+$ uptake, $meq \cdot g^{-1}$ | IEC, $meq \cdot g^{-1}$ | $Na^+/M^{2+},*$ molar ratio |
|---|---|---|---|---|---|---|---|
| A   | 38.06 | 35.93 | 14.6 | 0.20 | 5.9 | 2.9 | 2.2 |
| SA1 | 32.51 | 29.92 | 16.1 | 0.15 | 6.3 | 3.8 | 2.0 |
| SA2 | 50.32 | 45.88 | 15.9 | 0.22 | 6.5 | 3.5 | 2.2 |
| SA3 | 26.43 | 25.04 | 14.4 | 0.11 | 6.3 | 3.1 | 2.2 |
| SA4 | 60.38 | 55.37 | 14.1 | 0.25 | 7.2 | 3.5 | 2.0 |

*$Na^+/M^{2+}$: moles of $Na^+$ released over moles of $M^{2+}$ adsorbed by TiP1

The surface characteristics of the five samples were determined using BET, with results shown in Table 3 and FIG. 6. In each case, the surface area consists mainly of external surface area, indicating that micropores are not present in the materials. The pore size distribution in FIG. 6 also indicates that the materials are mostly composed of meso- and macro pores, which is a necessary condition for effective sorption. Surface area ranges between ca. 26 and 60 $m^2 \cdot g^{-1}$, which is considerably lower than the surface area of TiP1 synthesised in our previous studies using cobalt ions (114 $m^2 \cdot g^{-1}$) [M. Trublet, M. V. Maslova, D. Rusanova and O. N. Antzutkin, Mater. Chem. Phys., 2016, 183, 467-475.] Although in certain cases surface area appears to be more than three times lower, the $Na^+$ uptake of these systems does not seem to be affected to the same extent (see below). This indicates that chemisorption is the governing factor in the ion-exchange process on TiP1 surfaces.

Table 3 also shows the different sorption characteristics of the studied TiP1 ion-exchangers. For TiP ion-exchangers, the maximum sorption capacity is determined on the basis of sodium uptake. FIG. 7 shows a comparison of the sorption performance of Na—TiP1 and H—TiP1 forms towards divalent metal ions, and it can be seen that the sorption capacity of the H—TiP1 ion-exchanger (ca 0.8 $meq \cdot g^{-1}$) is considerably less than that of the sodium form (ca 3.4 $meq \cdot g^{-1}$). This is consistent with previously reported data demonstrating that the alkaline form of TiP1 ion-exchangers has a considerably greater capacity for ion-exchange towards metal ions. The other advantage of using the Na-form of TiP1 involves the possible pH changes of the medium: when the H-form is used, it induces a pH drop after the sorption experiment that could initiate other processes [M. Trublet, M. V. Maslova, D. Rusanova and O. N. Antzutkin, RSC Adv., 2017, 7, 1989-2001; A. Clearfield, A. I. Bortun, S. A. Khainakov, L. N. Bortun, V. V Strelko and V. N. Khryaschevskii, Waste Manag., 1998, 18, 203-210.; A. I. Bortun, L. N. Bortun, A. Clearfield, S. A. Khainakov, V. V. Strelko, V. N. Khryashevskii, A. P. Kvashenko and I. I. Voitko, Solvent Extr. Ion Exch., 1997, 15, 515-532; A. I. Bortun, L. N. Bortun, A. Clearfield, M. A. Villa-García, J. R. García and J. Rodríguez, J. Mater. Res., 1996, 11, 2490-2498.]

The actual maximum exchange capacity of TiP1-type sorbents is not described by the theoretical exchange capacity (TEC), but by the amount of exchangeable sodium ions per gram of sorbent, hence corresponding to the uptake of sodium ions by TiP1s. The $Na^+$ uptakes observed for the TiP1 sorbents studied in this work range from 5.9 to 7.2 $meq \cdot g^{-1}$. These $Na^+$ uptakes are among the highest values reported [M. V. Maslova, D. Rusanova, V. Naydenov, O. N. Antzutkin and L. G. Gerasimova, J. Non. Cryst. Solids, 2012, 358, 2943-2950; A. S. Chugunov, M. V. Maslova and L. G. Gerasimova, Radiochemistry, 2012, 54, 549-557; A. Clearfield, A. I. Bortun, S. A. Khainakov, L. N. Bortun, V. V Strelko and V. N. Khryaschevskii, Waste Manag., 1998, 18, 203-210; W. Zhang, R. Koivula, E. Wiikinkoski, J. Xu, S. Hietala, J. Lehto and R. Harjula, ACS Sustain. Chem. Eng., 2017, 5, 3103-3114; A. I. Bortun, J. García, T. A. Budovitskaya, V. V. Strelko and J. Rodríguez, Mater. Res. Bull., 1996, 31, 487-496.] for amorphous TiP ion exchangers, which are typically between 2.5 and 5.6 $meq \cdot g^{-1}$. It is interesting to note that TiP1-SA4 displayed the highest $Na^+$ uptake among the TiP1 sorbents synthesised in this embodiment.

The ion-exchange capacity (IEC) reported in Table 3 was determined experimentally for the sodium form of TiP1 products in contact with synthetic water containing $Cu^{2+}$, $Zn^{2+}$, $Mn^{2+}$, $Ni^{2+}$ and $Co^{2+}$ ions (5 mM each). More details on the sorption experiments are given in FIG. 8. The molar ratio between the sodium ions released and the metal ions uptaken by the sorbents (Table 3) were also obtained during the sorption experiment using this synthetic water. The IEC recorded for the different TiP1 materials ranges from 2.9 to 3.8 $meq \cdot g^{-1}$. These recorded IEC are relatively close to the value previously reported by Trublet et al. for TiP1 synthesised with cobalt(II) as a matrix directing agent, (Co)TiP1, (3.1 $meq \cdot g^{-1}$) [M. Trublet, M. V. Maslova, D. Rusanova and O. N. Antzutkin, Mater. Chem. Phys., 2016, 183, 467-475.]

The amount of exchangeable $Na^+$ per mole of metal ions adsorbed ($Na^+/M^{2+}$) was determined and was found to be 2.1±0.1 (Table 3). This ratio relates to the reaction:

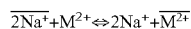

$$\overline{2Na^+} + M^{2+} \Leftrightarrow 2Na^+ + \overline{M^{2+}}$$

where the line over "$2Na^+$" and "$M^{2+}$" symbolises the sorbent surface.

The selectivity of the materials in their sodium and proton forms was also studied and results can be found in FIGS. 8 and 7, respectively. The sorption profile of the five materials in their sodium form is very similar and a selectivity order can be established: $Cu^{2+} > Zn^{2+} >> Mn^{2+} > Co^{2+}$, $Ni^{2+}$. As mentioned previously, the ion exchange capacity (IEC) of H—TiP1 materials is much lower (ca. 0.8 $meq \cdot g^{-1}$) than that of Na—TiP1 materials, therefore, making it difficult to clearly distinguish selectivity. Nevertheless, an order of selectivity comparable to that of Na—TiP1 can be estimated, giving $Cu^{2+}$, $Zn^{2+} > Mn^{2+} > Co^{2+}$, $Ni^{2+}$. The same selectivity series was found for previously obtained (Co)TiP1 synthesised using cobalt ions as matrix-modifying agents [M. Trublet, M. V. Maslova, D. Rusanova and O. N. Antzutkin, RSC Adv., 2017, 7, 1989-2001.] Thus, the type of titanium sources (from high purity to low purity grade) used to synthesise TiP1 does not seem to influence the sorption properties of the final material.

In summary, amorphous titanium phosphate ion-exchangers are often obtained as mixtures of two exchangeable groups (—$HPO_4$ and —$H_2PO_4$) and are often synthesised using $TiCl_4$ as the main source of titanium. Changing the titanium source or synthesis conditions (temperature, acidity, reaction time) can lead to a compound with different ratios between —$HPO_4$ and —$H_2PO_4$ groups, making synthesis of TiP somewhat challenging. Results presented in this embodiment has revealed that amorphous TiP1, with the chemical formula $TiO(OH)(H_2PO_4) \cdot H_2O$, can successfully be obtained under mild conditions using different $TiOSO_4$ sources (powders or solutions) of different synthetic grades with a $P_2O_5:TiO_2$ molar ratio of close to 1:1. Uniform synthesis of TiP1-type materials does not depend on the degree of purity (from technical-grade leachates of titanite minerals to synthetic-grade solutions), nor the state of the $TiOSO_4$ source used (powder or solution) when the synthesis conditions (temperature, titanium and sulphuric acid contents in the primary source and post-synthetic treatment) are controlled. The post-synthetic treatments consisted in successive acidic washings and it was shown that $TiO(OH)(H_2PO_4)\cdot H_2O$ could be obtained using organic or inorganic acids such as HCl, $HNO_3$ and citric acid.

The TiP1 materials studied displayed low porosity with low surface areas, ranging from 26.43 to 60.38 $m^2 \cdot g^{-1}$, but this does not appear to have a significant impact on their sorption capacity. The maximum capacity of all the synthesised TiP compounds in this study, expressed as the sodium uptake, was determined to be between 5.9 and 7.2 $meq \cdot g^{-1}$. This result is one of the highest reported sodium uptake values for TiP materials, leading to a high ion-exchange capacity (tested for a synthetic water), determined as 2.9-3.8 $meq \cdot g^{-1}$.

As concerns synthesis procedures and the sorption characteristics of all TiP1 materials synthesised in this study, the SA4 source seems to be the most suitable. A study of the sorption mechanism was pursued by recording the surface area of the TiP1 sorbents and the $Na^+/M^{2+}$ ratio from sorption experiments. The $Na^+/M^{2+}$ ratio was estimated to be about 2.1±0.1, supporting the fact that ion-exchange is the driving force of the material, where two moles of $Na^+$ are exchanged for one mole of $M^{2+}$. The TiP1 sorbent displayed best so far known sorption properties towards divalent metal ions and can be readily synthesised from $TiOSO_4$ solutions and powders of varying grades.

Above, the invention has been described with reference to specific embodiments. The invention is, however, not limited to these embodiments. It is obvious to a person skilled in the art that other embodiments are possible within the scope of the following claims.

The invention claimed is:

1. A process for performing a aqueous synthesis of titanium phosphates (TiP) having solely —$H_2PO_4$ groups, which process includes the following steps:
providing titanium(IV) oxysulphate, $TiOSO_4$, in an aqueous solution or in a powder and $H_2SO_4$, substantially without transition divalent metal ions, including cobalt (II) and copper(II),
heating of the thus formed aqueous solution to above 50° C., but below 85° C. for at least 30 minutes,
providing a controlled amount of $H_3PO_4$ to said aqueous solution, to form an aqueous solution containing a molar ratio between $TiO_2$ and $P_2O_5$ being controlled to about 1:1, not above 1:1.5 and not below 1:0.7,
stirring the thus formed aqueous solution for at least 3 hours to form precipitates of titanium phosphate, and allowing ageing of said solution, without stirring,
acidic washing of the formed precipitate using HCl or other acids to obtain $TiO(OH)(H_2PO_4)\cdot H_2O$ having solely —$H_2PO_4$ ion-exchange chemical groups and allowing said precipitates to dry to a powder product,
substituting protons in the powder product $TiO(OH)(H_2PO_4)\cdot H_2O$ to sodium cations by treatment of the latter with solutions of sodium carbonate and allowing the thus formed powder of Na—TiP1 to dry.

2. The process according to claim 1, wherein said heating of the aqueous solution is made at a temperature above 60° C.

3. The process according to claim 2, wherein said heating of the aqueous solution is made at a temperature below 80° C.

4. The process according to claim 2, wherein said heating of the aqueous solution is performed for at least 45 minutes.

5. The process according to claim 2, wherein the stirring of the aqueous solution is performed for at least 5 hours.

6. The process according to claim 2, wherein the stirred aqueous solution is allowed to age for at least 8 hours without stirring.

7. The process according to claim 1, wherein said heating of the aqueous solution is made at a temperature below 80° C.

8. The process according to claim 1, wherein said heating of the aqueous solution is performed for at least 45 minutes.

9. The process according to claim 1, wherein the stirring of the aqueous solution is performed for at least 8 hours.

10. The process according to claim 1, wherein the stirred aqueous solution is allowed to age for at least 6 hours without stirring.

11. The process according to claim 1, wherein the acidic washing of the formed precipitates of titanium phosphate are washed with diluted HCl.

12. The process according to claim 11, wherein the cleaning of the formed precipitates of titanium phosphate is followed by a rinsing step with distilled water, in which the formed precipitates of titanium phosphate have a chemical formula of: $TiO(OH)(H_2PO_4)\cdot H_2O$.

13. The process according to claim 12, wherein exchangeable protons in the final product, $TiO(OH)(H_2PO_4)\cdot H_2O$ powder, are substituted to sodium cations by treatment of the latter with a solution of disodium carbonate and allowing the powder (TiP1-Na) to dry.

14. The process according to claim 1, wherein said molar ratio between $TiO_2$ and $P_2O_5$ is controlled to lie between 1:1.1 and not below 1:0.9.

* * * * *